US009816867B2

(12) United States Patent
Ishikawa et al.

(10) Patent No.: US 9,816,867 B2
(45) Date of Patent: Nov. 14, 2017

(54) THERMISTOR FIXING STRUCTURE, THERMISTOR REMOVING METHOD, AND AIR-CONDITIONING APPARATUS

(71) Applicant: Mitsubishi Electric Corporation, Tokyo (JP)

(72) Inventors: Masato Ishikawa, Tokyo (JP); Takuya Goto, Tokyo (JP); Akimoto Suzuki, Tokyo (JP); Masahide Kinami, Tokyo (JP); Hisanori Ikeda, Tokyo (JP); Shuhei Yokota, Tokyo (JP); Youhei Koyanagi, Tokyo (JP); Katsuya Ishigami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 370 days.

(21) Appl. No.: 14/601,370

(22) Filed: Jan. 21, 2015

(65) Prior Publication Data

US 2015/0233769 A1     Aug. 20, 2015

(30) Foreign Application Priority Data

Feb. 19, 2014 (JP) .................................. 2014-029862

(51) Int. Cl.
  *G01K 1/14*   (2006.01)
  *G01K 7/22*   (2006.01)
(52) U.S. Cl.
  CPC ................. *G01K 1/14* (2013.01); *G01K 7/22* (2013.01); *Y10T 29/49085* (2015.01)
(58) Field of Classification Search
  CPC .......... G01K 1/14; G01K 1/143; G01K 1/146; G01K 7/16; G01K 7/22
  (Continued)

(56) References Cited

U.S. PATENT DOCUMENTS 4,349,993 A * 9/1982 Tanaka .................. E06B 3/5828
                                                    52/204.591
5,590,567 A * 1/1997 Marrs ...................... F16C 1/105
                                                        248/67.7
(Continued)

FOREIGN PATENT DOCUMENTS

CN          2849549 Y     12/2006
CN        201122114 Y      9/2008
        (Continued)

OTHER PUBLICATIONS

Extended European Search Report dated Jun. 23, 2015 in the corresponding EP Application No. 15151690.3.
(Continued)

*Primary Examiner* — Lisa Caputo
*Assistant Examiner* — Nathaniel T Woodward
(74) *Attorney, Agent, or Firm* — Posz Law Group, PLC

(57) ABSTRACT

Provided is a thermistor fixing structure capable of facilitating insertion of a thermistor into a temperature sensitive cylinder, and preventing the thermistor from easily dropping off the temperature sensitive cylinder. In a thermistor fixing structure (4000), a fixture (400) for pressing a thermistor (80) against an inner surface of a temperature sensitive cylinder (90) includes an inner bending section (20) formed at one end portion (12) of a longitudinal section (10) so as to function as a stopper for the thermistor (80) inserted into the temperature sensitive cylinder (90) from a cylinder insertion end (95), an outer bending section (50) formed at the one end portion (12) of the longitudinal section (10) so as to be opposed to a cylinder stop end (94), and an inner folding section (30) and an outer folding section (60) formed at another end portion (13) of the longitudinal section (10) so as to sandwich a cylinder top surface of the temperature sensitive cylinder (90). A side surface of the thermistor (80) is pressed at two points corresponding to an apex of a
(Continued)

projecting portion (32) formed on the inner folding section (30) and a distal end (41) of a pressing section (40) formed continuously with the inner folding section (30), and a contact angle (α) formed between the pressing section (40) and the side surface of the thermistor (80) on the cylinder insertion end (95) side is an acute angle.

19 Claims, 13 Drawing Sheets

(58) Field of Classification Search
USPC .... 374/208, 147, 141, 148, E1.001, E1.002; 248/74.1, 74.2, 62, 49, 316.7
See application file for complete search history.

(56) References Cited

U.S. PATENT DOCUMENTS

| | | | | |
|---|---|---|---|---|
| 5,644,106 | A * | 7/1997 | Gajeski | H05K 7/02 174/138 G |
| 5,993,061 | A * | 11/1999 | Drouet | G01K 1/143 374/147 |
| 6,334,707 | B1 * | 1/2002 | Ku | G01K 1/143 374/147 |
| 6,550,962 | B1 * | 4/2003 | Yang | F16L 3/04 24/458 |
| 6,814,486 | B2 * | 11/2004 | Sidoni | G01K 1/143 374/147 |
| 7,824,101 | B2 * | 11/2010 | Kloiber | G01D 11/245 374/147 |
| 2002/0134162 | A1 * | 9/2002 | Schmermund | G01L 11/002 73/708 |
| 2004/0037350 | A1 * | 2/2004 | Parmicza | G01K 7/02 374/163 |
| 2006/0203878 | A1 * | 9/2006 | Pearl | B65H 35/002 374/141 |
| 2007/0140312 | A1 * | 6/2007 | Seo | G01K 1/14 374/145 |
| 2008/0008227 | A1 * | 1/2008 | Jang | G01K 1/14 374/208 |
| 2010/0067562 | A1 * | 3/2010 | Wakabayashi | G01K 1/14 374/208 |
| 2011/0122918 | A1 * | 5/2011 | Murray | F22B 37/46 374/208 |

FOREIGN PATENT DOCUMENTS

| | | | |
|---|---|---|---|
| JP | S57-26036 U | | 2/1982 |
| JP | 59-72523 U | | 5/1984 |
| JP | S59-72524 | * | 5/1984 |
| JP | S59-72524 U | | 5/1984 |
| JP | S60-123643 | * | 8/1985 |
| JP | S60-123643 U | | 8/1985 |
| JP | H02-069733 U | | 5/1990 |
| JP | 11-118304 A | | 4/1999 |

OTHER PUBLICATIONS

Office Action dated Feb. 22, 2017 issued in corresponding CN patent application No. 201510084575.0 (and English translation).
Office Action dated Mar. 21, 2017 issued in corresponding JP patent application No. 2014-029862 (and English translation).
Office Action dated Aug. 28, 2017 issued in corresponding CN patent application No. 201510084575.0 (and English translation).

* cited by examiner

F I G. 3
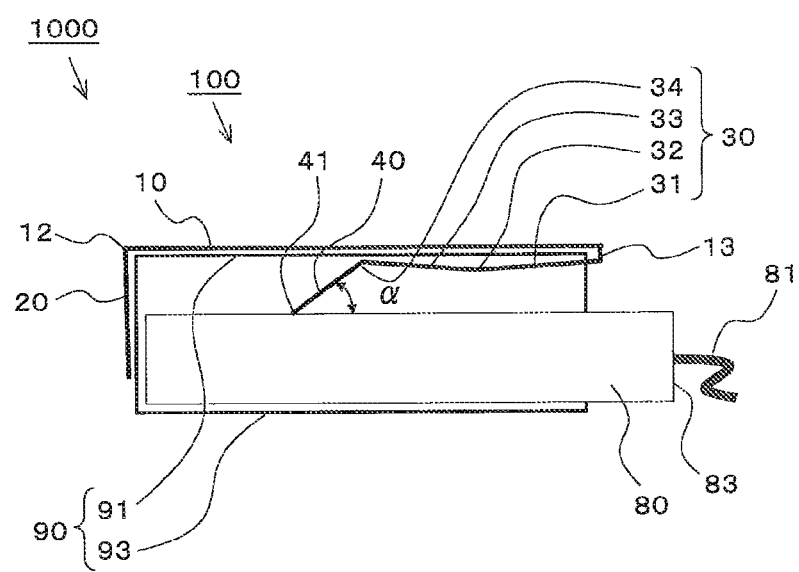

THERMISTOR FIXING STRUCTURE, THERMISTOR REMOVING METHOD, AND AIR-CONDITIONING APPARATUS

BACKGROUND OF THE INVENTION

1. Field of the Invention

The present invention relates to a thermistor fixing structure, a thermistor removing method, and an air-conditioning apparatus, and more particularly, to a thermistor fixing structure having a thermistor fixed to a temperature sensitive cylinder thereof, a thermistor removing method for removing the thermistor fixed to the thermistor fixing structure from the temperature sensitive cylinder, and an air-conditioning apparatus including the thermistor fixing structure.

2. Description of the Related Art

Hitherto, as a thermistor fixing structure, for example, the following invention is disclosed (see, Patent Literature 1). In this invention, a temperature sensitive cylinder is brazed to a temperature detection portion of a refrigerant pipe of a refrigeration cycle apparatus, which is a part to be subjected to temperature detection, and a columnar thermistor is inserted into the temperature sensitive cylinder and fixed in such a manner that the thermistor is pressed against an inner surface of the temperature sensitive cylinder with a leaf spring.

Patent Literature 1; Japanese Utility Model Application No. Sho 57-168819 (microfilm of Japanese Utility Model Application Laid-open No. Sho 59-72523) (page 1, FIG. 5)

The leaf spring of the invention disclosed in the Patent Literature 1 has two serial circular-arc (substantially w-shape with smooth peaks) curved sections formed on a strip-like plate member. One end portion of the leaf spring is bent into a substantially C-shape to form a locking section, and the other end portion of the leaf spring is bent into a substantially L-shape to form an abutting section.

Thus, when the curved sections of the leaf spring are inserted into the temperature sensitive cylinder, the locking section of the leaf spring is locked onto an outer surface of the temperature sensitive cylinder from one end surface side thereof, and the abutting section of the leaf spring is brought into abutment against the other end surface of the temperature sensitive cylinder, the leaf spring does not easily drop off the temperature sensitive cylinder. In this state, when the thermistor is inserted into the temperature sensitive cylinder, the thermistor is pressed against the inner surface of the temperature sensitive cylinder with a spring force of the leaf spring (corresponding to an elastic restoration force of each curved section).

In the invention disclosed in the Patent Literature 1, however, the peaks of the two curved sections formed on the leaf spring are configured to be brought into contact with the thermistor, and each of the peaks is formed into a shape of a circular arc having a relatively large curvature radius. Therefore, the thermistor is easily insertable into the temperature sensitive cylinder while overcoming the spring force of the leaf spring (to be accurate, a frictional force caused by the spring force), but at the same time, the thermistor is easily removable from the temperature sensitive cylinder to the outside.

In this case, there is a problem in that, for example, when a lead wire connected to the thermistor is unintentionally pulled at the time of assembling, or when the lead wire is caught on any portion, the thermistor is easily detached from the temperature sensitive cylinder.

When the spring force is increased so as to prevent the thermistor from being easily detached from the temperature sensitive cylinder, on the other hand, a greater force is required to insert the thermistor into the temperature sensitive cylinder, thereby leading to a problem in that the workability is degraded.

SUMMARY OF THE INVENTION

The present invention has been made to solve the problems as described above, and it is therefore a first object of the present invention to provide a thermistor fixing structure capable of facilitating insertion of a thermistor into a temperature sensitive cylinder, and preventing the thermistor from easily dropping off the temperature sensitive cylinder.

It is a second object of the present invention to provide a thermistor removing method for easily removing the thermistor fixed to the thermistor fixing structure from the temperature sensitive cylinder.

It is a third object of the present invention to provide an air-conditioning apparatus including the thermistor fixing structure.

(1) According to one embodiment of the present invention, there is provided a thermistor fixing structure, including: a temperature sensitive cylinder having openings at both ends thereof; a thermistor inserted into the temperature sensitive cylinder; and a fixture comprising a pressing section for pressing the thermistor against an inner surface of the temperature sensitive cylinder. A distal end of the pressing section is brought into abutment against a side surface of the thermistor inserted into the temperature sensitive cylinder. An angle formed between the pressing section and the side surface of the thermistor on a cylinder insertion end side of the temperature sensitive cylinder is an acute angle.

(2) Further, according to one embodiment of the present invention, there is provided a thermistor removing method for removing a thermistor fixed to a thermistor fixing structure from a temperature sensitive cylinder, the thermistor fixing structure including: a temperature sensitive cylinder having openings at both ends thereof; a thermistor inserted into the temperature sensitive cylinder; and a fixture including a pressing section for pressing the thermistor against an inner surface of the temperature sensitive cylinder, a distal end of the pressing section being brought into abutment against a side surface of the thermistor inserted into the temperature sensitive cylinder, an angle formed between the pressing section and the side surface of the thermistor on a cylinder insertion end side of the temperature sensitive cylinder being an acute angle. The thermistor removing method includes: inserting a strip-like separation plate member into the temperature sensitive cylinder from the cylinder insertion end; thrusting the separation plate member into an abutting portion between the distal end of the pressing section and the side surface of the thermistor; removing the thermistor from the temperature sensitive cylinder; and removing the separation plate member from the temperature sensitive cylinder.

(3) In addition, according to one embodiment of the present invention, there is provided an air-conditioning apparatus, including at least: a refrigerant pipe for executing a refrigeration cycle; and the thermistor fixing structure according to the embodiment (1), which is mounted to the refrigerant pipe.

(i) In the thermistor fixing structure according to the one embodiment of the present invention, the distal end of the pressing section of the fixture is brought into abutment against the side surface of the thermistor, and the angle formed between the pressing section and the side surface of the thermistor on the cylinder insertion end side is an acute angle. Therefore, when the thermistor is to be inserted in a direction from the cylinder insertion end toward the cylinder stop end, the distal end of the pressing section is slid along the side surface of the thermistor so as to receive a force in a direction in which the pressing section is released from the side surface of the thermistor. Thus, the insertion of thermistor is facilitated. When the thermistor is to be removed in a direction from the cylinder stop end toward the cylinder insertion end, on the other hand, the pressing section receives a force toward the side surface of the thermistor so that the distal end of the pressing section may dig into the side surface of the thermistor. Thus, the removal of the thermistor is disabled or restricted.

Thus, even when the insertion of the thermistor is facilitated by reducing the pressing force for pressing the thermistor with the pressing section, the removal of the thermistor is disabled or restricted, and thus the pressing section, that is, the fixture can be downsized and light-weighted.

(ii) In the thermistor removing method according to the one embodiment of the present invention, the thermistor is removed from the temperature sensitive cylinder under a state in which the separation plate member is thrust into the abutting portion between the distal end of the pressing section and the side surface of the thermistor, and hence the pressing section is slid along the separation plate member. Thus, the distal end of the pressing section does not dig into the side surface of the thermistor, thereby facilitating the removal of the thermistor.

(iii) Further, the air-conditioning apparatus according to the one embodiment of the present invention includes the thermistor fixing structure according to the embodiment (1), which is mounted to the refrigerant pipe. Therefore, for example, even when the lead wire connected to the thermistor is unintentionally pulled at the time of assembling, or when the lead wire is caught on any portion, the thermistor is not easily detached from the temperature sensitive cylinder. Thus, the workability is enhanced at the time of assembling.

BRIEF DESCRIPTION OF THE DRAWINGS

FIG. 3 is an entire side sectional view illustrating the thermistor fixing structure illustrated in FIGS. 1A and 1B.

DETAILED DESCRIPTION OF THE PREFERRED EMBODIMENTS

First Embodiment

Figure 1A:
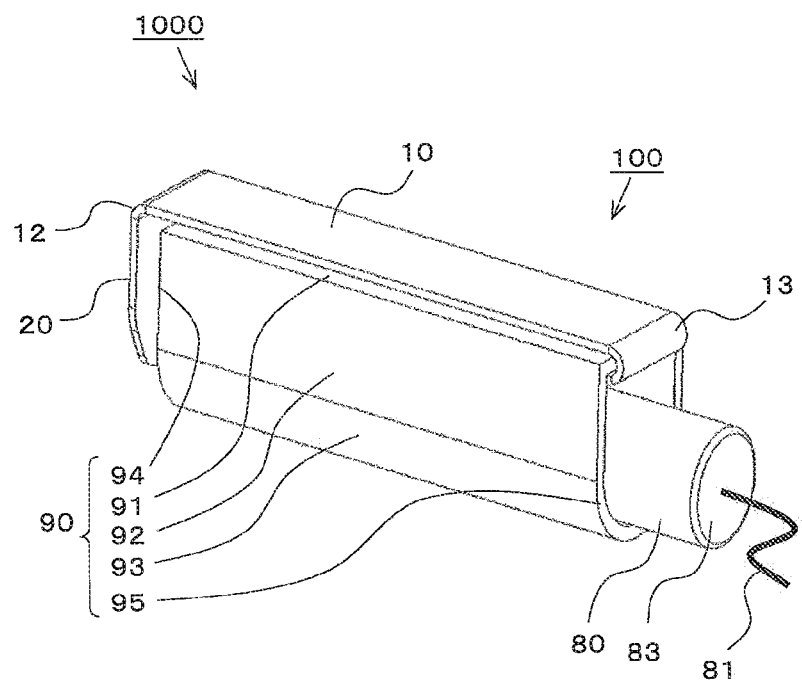
FIGS. 1A and 1B are entire perspective views each illustrating a thermistor fixing structure according to a first embodiment of the present invention.
Figure 4A:
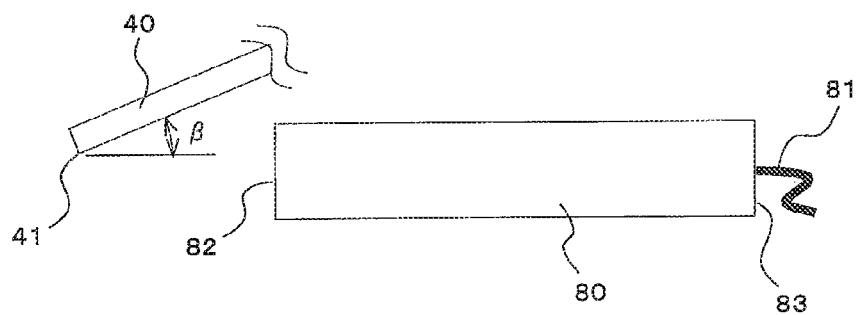
FIGS. 4A to 4C are side views each illustrating a function of the part (fixture) of the thermistor fixing structure illustrated in FIGS. 1A and 1B.
Figure 4B:
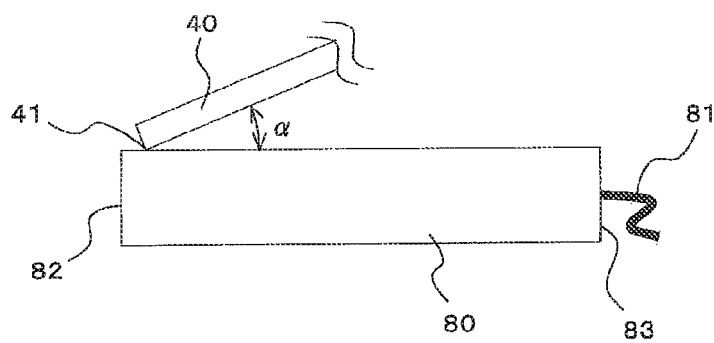
Figure 4C:
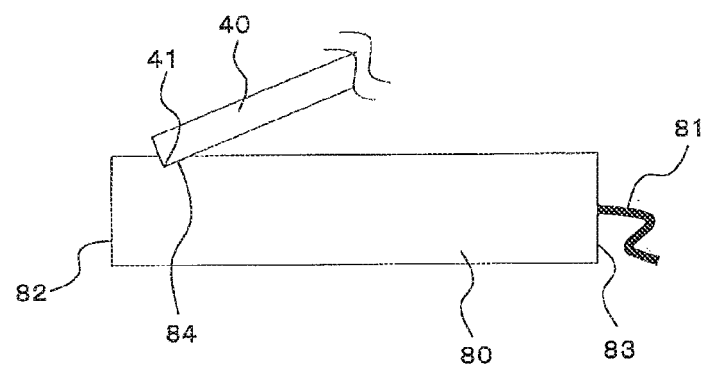

FIGS. 1A to 4C illustrate a thermistor fixing structure according to a first embodiment of the present invention. FIGS. 1A and 1B are entire perspective views each illustrating the thermistor fixing structure. FIGS. 2A and 2B are perspective views each illustrating a part (fixture) of the thermistor fixing structure. FIG. 3 is an entire side sectional view illustrating the thermistor fixing structure. FIGS. 4A to 4C are side views each illustrating a function of the part (fixture) of the thermistor fixing structure. Note that, the respective figures are schematic views, and the present invention is not limited to the illustrations of the respective figures.

(Thermistor Fixing Structure)

Figure 1B:
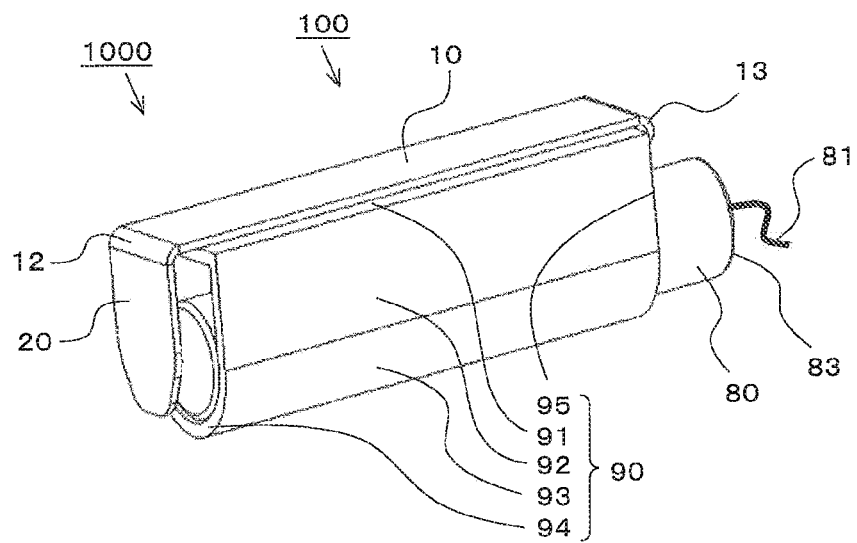

In FIGS. 1A and 1B, a thermistor fixing structure 1000 includes a temperature sensitive cylinder 90 having openings at both ends thereof, a thermistor 80 inserted into the temperature sensitive cylinder 90, and a fixture 100 including a pressing section 40 (see FIGS. 2A and 2B) for pressing the thermistor 80 against an inner surface of the temperature sensitive cylinder 90.

(Temperature Sensitive Cylinder and Thermistor)

The temperature sensitive cylinder 90 has a substantially horseshoe shape in cross section. The temperature sensitive cylinder 90 has a planar cylinder top surface 91, a pair of cylinder side surfaces 92, and a circular-arc cylinder bottom surface 93. For convenience of the description, one end of the temperature sensitive cylinder 90 is referred to as "cylinder stop end 94," and the other end of the temperature sensitive cylinder 90 is referred to as "cylinder insertion end 95."

The thermistor 80 is a temperature sensor for measuring the temperature of an object to be measured through use of a semiconductor device called "thermistor," and is formed into a cylindrical shape from copper or a copper alloy having high thermal conductivity. For convenience of the description, one end surface of the thermistor 80 is referred to as "stop-side end surface 82," and the other end surface of the thermistor 80 is referred to as "insertion-side end surface 83." A lead wire 81 is connected to the insertion-side end surface 83.

(Fixture)

Figure 2A:
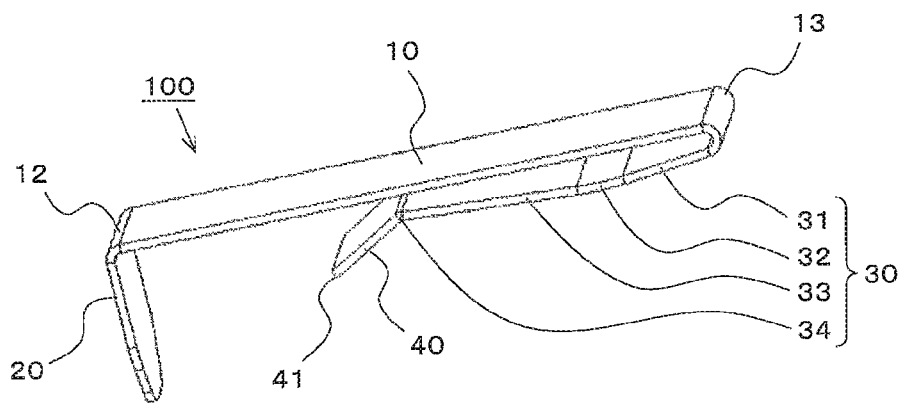
FIGS. 2A and 2B are perspective views each illustrating a part (fixture) of the thermistor fixing structure illustrated in FIGS. 1A and 1B.
Figure 2B:
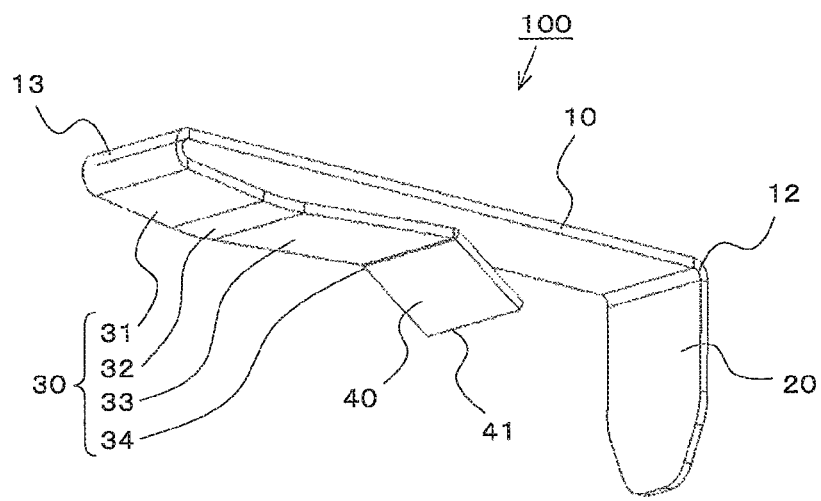

In FIGS. 2A and 2B, the fixture 100 is formed by bending a plate member. The fixture 100 includes a longitudinal section 10, a bending section 20 formed continuously with one end portion 12 of the longitudinal section 10 in a longitudinal direction thereof, a folding section 30 formed continuously with another end portion 13 of the longitudinal section 10 in the longitudinal direction so as to extend toward the bending section 20, and the pressing section 40 formed continuously with a distal end 34 of the folding section 30 so as to be inclined gradually away from the longitudinal section 10.

Note that, the end portion 12 of the longitudinal section 10 corresponds to an end portion of the bending section 20, exhibiting a range of a circular arc (quarter circle) in side view, and the bending section 20 is perpendicular to the longitudinal section 10. Further, the end portion 13 of the longitudinal section 10 corresponds to an end portion of the folding section 30, exhibiting a range of a circular arc (substantial semicircle) in side view.

A material for the plate member that forms the fixture 100 is not limited, and only needs to be bendable so that a predetermined pressing force is obtained when the fixture 100 is elastically deformed as described later. A material having rust-proof property is further preferred. For example, a stainless spring material (SUS304-CSP, SUS301-CSP, or SUS631) or phosphor bronze (C5191P or C5210P) may be used suitably.

The folding section 30 is slightly bent into a substantially dogleg shape. The folding section 30 includes an insertion-side inclined portion 31 inclined away from the longitudinal section 10 as being closer to the distal end 34, a stop-side inclined portion 33 inclined closer to the longitudinal section 10 as being closer to the distal end 34, and a projecting portion 32 formed between an inclined surface of the insertion-side inclined portion 31 and the stop-side inclined portion 33.

Note that, the insertion-side inclined portion 31, the projecting portion 32, and the stop-side inclined portion 33 may be formed into circular arcs having different curvature radii or equal curvature radii. Further, the present invention is not limited to the folding section 30 including the projecting portion 32, and encompasses a folding section 30 having a linear shape in a range of from the end portion of the folding section 30 (corresponding to the end portion 13 of the longitudinal section 10) to the distal end 34 of the folding section 30.

(Fixing Condition)

In FIG. 3, the longitudinal section 10 of the fixture 100 is arranged along an outer surface of the cylinder top surface 91 of the temperature sensitive cylinder 90. Further, the bending section 20 is brought into abutment against or opposed to the cylinder stop end 94, and the folding section 30 is inserted into the temperature sensitive cylinder 90 from the cylinder insertion end 95 side.

Then, the thermistor 80 is inserted into the temperature sensitive cylinder 90, and a distal end 41 of the pressing section 40 is brought into abutment against a side surface of the thermistor 80 so that the thermistor 80 is pressed against an inner surface of the cylinder bottom surface 93 of the temperature sensitive cylinder 90. Further, the distal end 34 of the folding section 30 is pressed against an inner surface of the cylinder top surface 91 of the temperature sensitive cylinder 90.

Note that, in FIG. 3, the stop-side end surface 82 of the thermistor 80 is positioned inward of the cylinder stop end 94 of the temperature sensitive cylinder 90, but the present invention is not limited thereto. The stop-side end surface 82 may be projected outward of the cylinder stop end 94.

In this case, when the stop-side end surface 82 of the thermistor 80 is brought into abutment against the bending section 20 of the fixture 100, the bending section 20 functions as a positioning member (stopper member).

(Actions and Effects)

In FIG. 4A, before or immediately after the thermistor 80 is inserted into the temperature sensitive cylinder 90, the stop-side end surface 82 of the thermistor 80 is not brought into contact with the pressing section 40 of the fixture 100, and hence the pressing section 40 is inclined from the longitudinal section 10 by an inclination angle β. That is, the longitudinal section 10 is parallel to the cylinder top surface 91 of the temperature sensitive cylinder 90, and hence the pressing section 40 is inclined from the cylinder bottom surface 93 of the temperature sensitive cylinder 90 by the inclination angle β.

In FIG. 4B, when the thermistor 80 is inserted while being slid along the cylinder bottom surface 93 of the temperature sensitive cylinder 90, the stop-side end surface 82 of the thermistor 80 is then brought into contact with the pressing section 40, and at least the pressing section 40 is bent in a direction in which the distal end 41 approaches the longitudinal section 10, with the result that the distal end 41 is slid along the side surface of the thermistor 80. In this case, an angle formed between the pressing section 40 and the side surface of the thermistor 80 on the cylinder insertion end 95 side (hereinafter referred to as "contact angle α") is an acute angle (α<90°), which is smaller than the initial inclination angle β (α<β).

That is, at least the pressing section 40 is elastically deformed so as to have the contact angle α smaller than the initial inclination angle β, and thus a pressing force for pressing the thermistor 80 against the temperature sensitive cylinder 90 is obtained.

Further, a frictional force to be applied to the pressing section 40 when the thermistor 80 is inserted is applied in a direction in which the pressing section 40 is released from the side surface of the thermistor 80. Thus, the insertion of the thermistor 80 is facilitated.

In FIG. 4C, when the thermistor 80 is to be moved in a direction opposite to the insertion direction under the state in which the thermistor 80 is pressed against the cylinder bottom surface 93 of the temperature sensitive cylinder 90, the pressing section 40 receives a frictional force containing a force component in a direction toward the side surface of the thermistor 80 so that the distal end 41 of the pressing section 40 may dig into the side surface of the thermistor 80. In this case, the end portion of the pressing section 40 on the folding section 30 side (corresponding to the distal end 34) is brought into abutment against the cylinder top surface 91 of the temperature sensitive cylinder 90, and hence the pressing section 40 functions as a "support bar (prop)" arranged between the cylinder top surface 91 of the temperature sensitive cylinder 90 and the side surface of the thermistor 80. Thus, the removal of the thermistor 80 is disabled or restricted.

Note that, the degree of the contact angle α of the present invention is not limited. For example, when the contact angle α is set within a range of from 20° to 50°, the insertion is facilitated, and the function of disabling or restricting the removal is obtained suitably.

As described above, in the thermistor fixing structure 1000, the thermistor 80 is pressed against the inner surface of the temperature sensitive cylinder 90 with the fixture 100, and thus accurate temperature measurement can be carried out.

Further, the removal of the thermistor 80 from the temperature sensitive cylinder 90 is disabled or restricted while the insertion of the thermistor 80 into the temperature sensitive cylinder 90 is facilitated, and thus the pressing section 40, that is, the fixture 100 can be downsized and light-weighted. Further, the fixture 100 is formed by bending the plate member, and thus the fixture 100 is manufactured easily at low cost.

Moreover, the bending section 20 of the fixture 100 is brought into abutment against or opposed to the cylinder stop end 94, and the longitudinal section 10 and the folding section 30 are arranged so as to sandwich the cylinder insertion end 95 side of the temperature sensitive cylinder 90, thereby being locked onto the temperature sensitive cylinder 90 (to be accurate, the longitudinal section 10 and the folding section 30 are opposed to each other with a clearance secured between the cylinder top surface 91 of the temperature sensitive cylinder 90 and each of the longitudinal section 10 and the folding section 30, or a part of one of the longitudinal section 10 and the folding section 30 is brought into abutment against the cylinder top surface 91). Thus, even under a state in which the thermistor 80 is not inserted, the fixture 100 does not easily drop off the temperature sensitive cylinder 90.

Second Embodiment

Figure 5A:
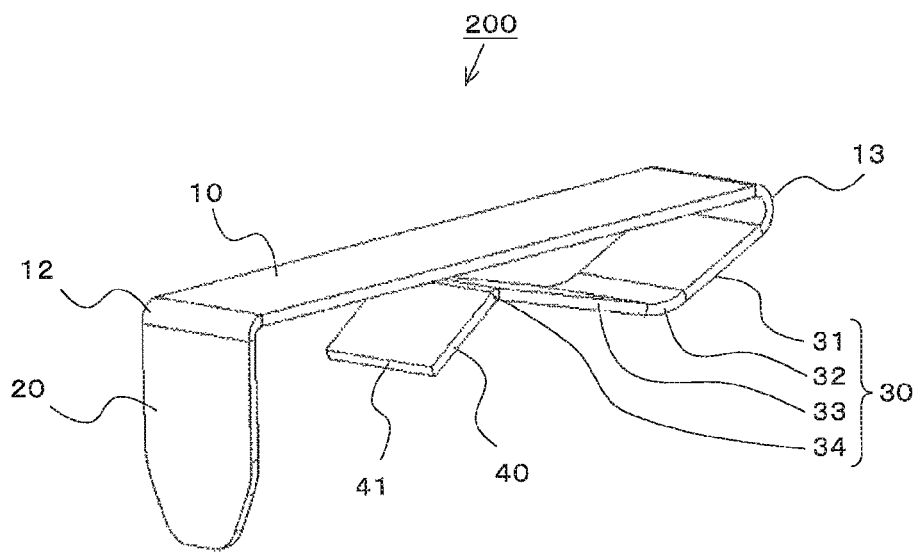
FIGS. 5A and 5B are perspective views each illustrating a part (fixture) of a thermistor fixing structure according to a second embodiment of the present invention.
Figure 5B:
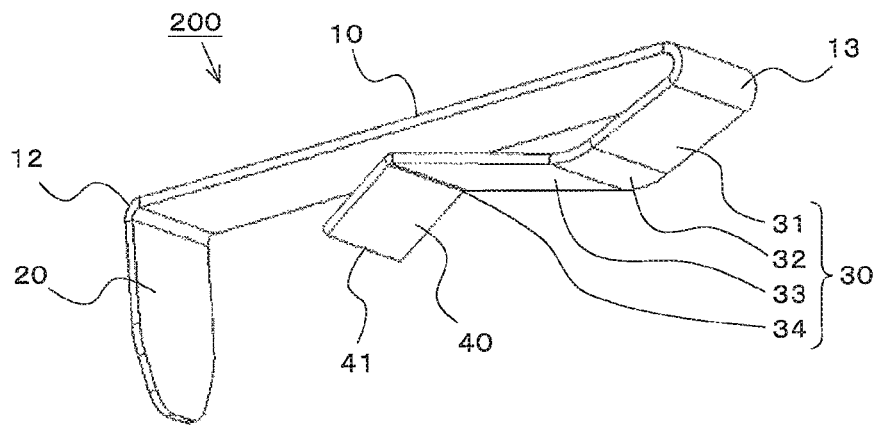
Figure 6:
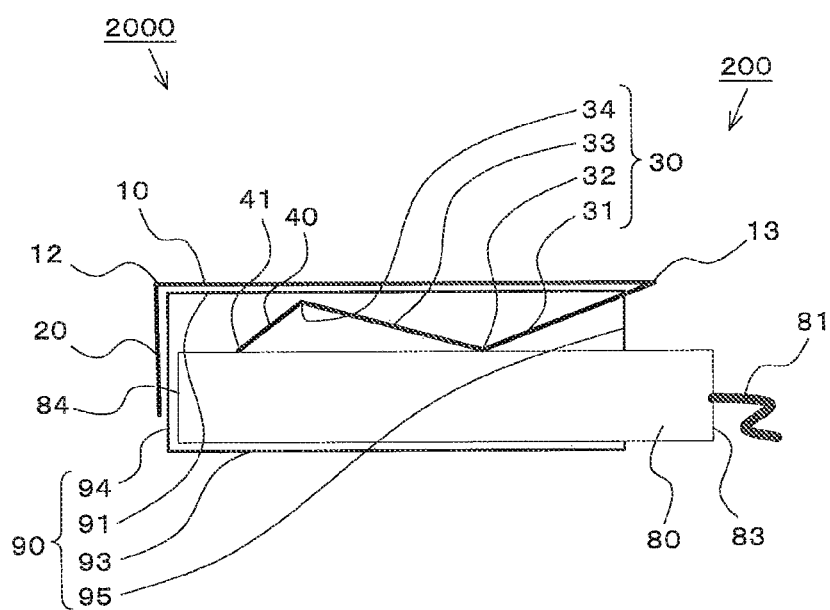
FIG. 6 is an entire side sectional view illustrating the thermistor fixing structure according to the second embodiment of the present invention.

FIGS. 5A to 6 illustrate a thermistor fixing structure according to a second embodiment of the present invention. FIGS. 5A and 5B are perspective views each illustrating a part (fixture) of the thermistor fixing structure. FIG. 6 is an entire side sectional view illustrating the thermistor fixing structure. Note that, the same or corresponding parts as or to those of the first embodiment are represented by the same reference symbols, and the description is partially omitted herein. Further, the respective figures are schematic views, and the present invention is not limited to the illustrations of the respective figures.

In FIGS. 5A, 5B, and 6, a thermistor fixing structure 2000 includes the temperature sensitive cylinder 90, the thermistor 80, and a fixture 200 including the pressing section 40 and the projecting portion 32 for pressing the thermistor 80 against the inner surface of the temperature sensitive cylinder 90.

The fixture 200 is formed by modifying the fixture 100 of the first embodiment. The folding section 30 is bent into a substantially dogleg shape. The folding section 30 includes the insertion-side inclined portion 31 inclined away from the longitudinal section 10 as being closer to the distal end 34, the stop-side inclined portion 33 inclined closer to the longitudinal section 10 as being closer to the distal end 34, and the projecting portion 32 formed between the inclined surface of the insertion-side inclined portion 31 and the stop-side inclined portion 33. The degrees of inclination of the insertion-side inclined portion 31 and the stop-side inclined portion 33 are larger than those of the fixture 100, and hence a distance between an apex of the projecting portion 32 and the longitudinal section 10 is substantially equal to a distance between the distal end 41 of the pressing section 40 and the longitudinal section 10.

Thus, both the apex of the projecting portion 32 and the distal end 41 of the pressing section 40 are brought into abutment against the side surface of the thermistor 80 inserted into the temperature sensitive cylinder 90 (see FIG. 6), and hence the thermistor 80 is pressed against the cylinder bottom surface 93 of the temperature sensitive cylinder 90 with pressing forces applied at those two points. Thus, the thermistor 80 is pressed stably so that the thermistor 80 is brought into contact with the cylinder bottom surface 93 of the temperature sensitive cylinder 90 more securely. As a result, the accuracy of temperature detection is enhanced.

Similarly to the thermistor fixing structure 1000 (first embodiment), in the thermistor fixing structure 2000, the insertion of the thermistor 80 is facilitated, and the removal of the thermistor 80 is disabled or restricted. In addition, the fixture 200 can be downsized and light-weighted, and manufactured easily at low cost. Further, even under the state in which the thermistor 80 is not inserted, the fixture 200 does not easily drop off the temperature sensitive cylinder 90.

In the above description, the projecting portion 32 is formed at one position, but may be formed at a plurality of positions.

Third Embodiment

Figure 7A:
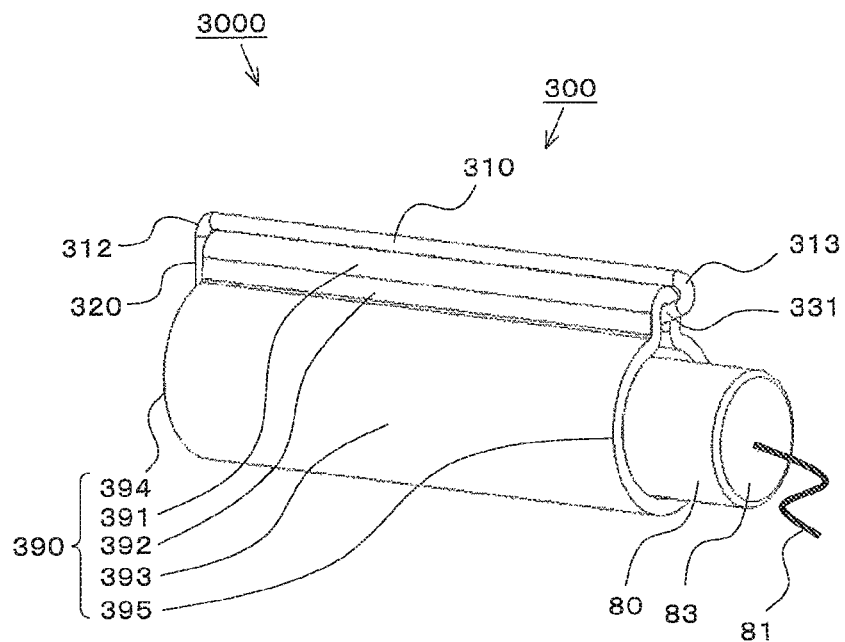
FIGS. 7A and 7B are entire perspective views each illustrating a thermistor fixing structure according to a third embodiment of the present invention.
Figure 7B:
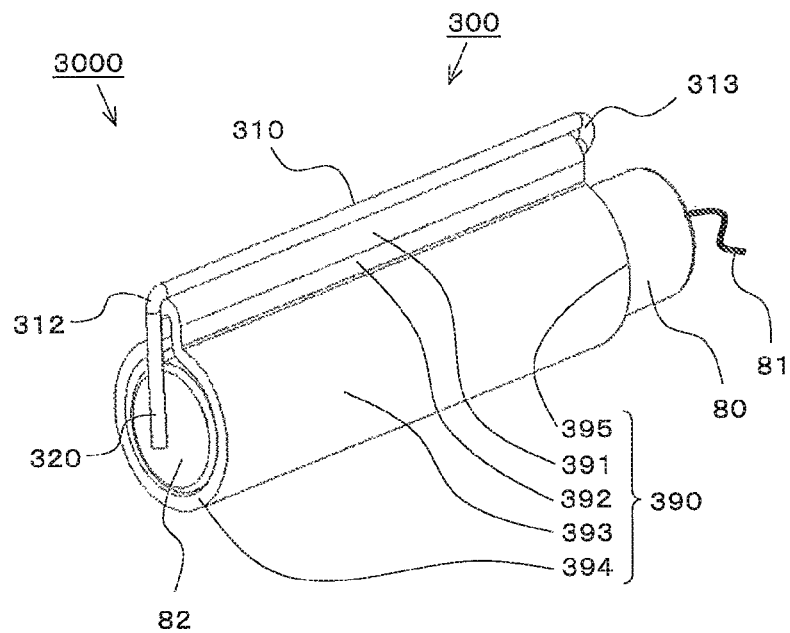
Figure 8:
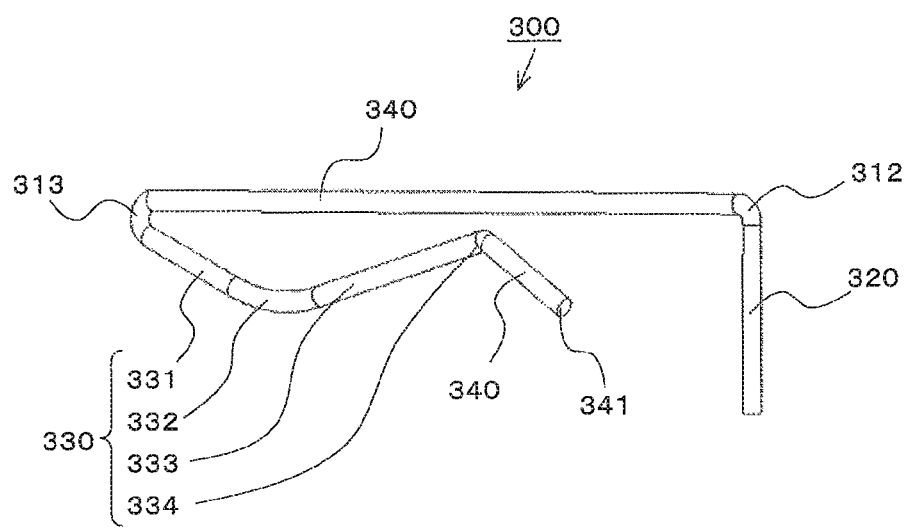
FIG. 8 is a perspective view illustrating a part (fixture) of the thermistor fixing structure according to the third embodiment of the present invention.

FIGS. 7A to 8 illustrate a thermistor fixing structure according to a third embodiment of the present invention. FIGS. 7A and 7B are entire perspective views each illustrating the thermistor fixing structure. FIG. 8 is a perspective view illustrating a part (fixture) of the thermistor fixing structure. Note that, the same or corresponding parts as or to those of the second embodiment are represented by reference symbols with the same last two numbers, and the description is partially omitted herein. Further, the respective figures are schematic views, and the present invention is not limited to the illustrations of the respective figures.

In FIGS. 7A, 7B, and 8, a thermistor fixing structure 3000 includes a temperature sensitive cylinder 390, the thermistor 80, and a fixture 300 including a pressing section 340 and a projecting portion 332 for pressing the thermistor 80 against an inner surface of the temperature sensitive cylinder 390.

The fixture 300 is formed by bending a wire (see FIG. 8) in place of the fixture 200 of the second embodiment, which is formed by bending the plate member.

That is, the fixture 300 includes a longitudinal section 310, a bending section 320, a folding section 330, and a pressing section 340.

The temperature sensitive cylinder 390 has a semicircular cylinder surface 391 having a semicircular shape in cross section, a pair of cylinder side surfaces 392, and a large cylinder surface 393 having a substantially C-shape (circular shape having a non-continuous part) in cross section. For convenience of the description, one end of the temperature sensitive cylinder 390 is referred to as "cylinder stop end 394," and the other end of the temperature sensitive cylinder 390 is referred to as "cylinder insertion end 395."

In this case, a curvature radius of an inner surface of the semicircular cylinder surface 391 is slightly larger than a radius of the wire that forms the fixture 300, and a distance between inner surfaces of the pair of cylinder side surfaces 392 is slightly larger than a diameter of the wire that forms the fixture 300. Further, a diameter of an inner surface of the large cylinder surface 393 is slightly larger than an outer diameter of the side surface of the thermistor 80.

Thus, both an apex of the projecting portion 332 and a distal end 341 of the pressing section 340 are brought into abutment against the side surface of the thermistor 80 inserted into the temperature sensitive cylinder 390, and hence the thermistor 80 is pressed against the large cylinder surface 393 of the temperature sensitive cylinder 390 with pressing forces applied at those two points (not shown).

In this case, the pair of cylinder side surfaces 392 supports the folding section 330 and the pressing section 340 in a sandwiching manner (the folding section 330 and the pressing section 340 may be supported in abutment against only one of the cylinder side surfaces 392), thereby preventing displacement of positions of an apex of the projecting portion 332 and the distal end 341 of the pressing section 340, which are brought into abutment against the side surface of the thermistor 80.

Thus, the thermistor fixing structure 3000 may attain actions and effects similar to those of the thermistor fixing structure 2000 (second embodiment). Further, the thermistor fixing structure 3000 includes the fixture 300 formed of the wire and the temperature sensitive cylinder 390 having the semicircular cylinder surface 391, thereby promoting downsizing of the thermistor fixing structure 3000.

In the above description, the thermistor fixing structure includes the fixture 300 formed by bending the wire in place of the plate member of the fixture 200 of the second embodiment, but the present invention is not limited thereto. The thermistor fixing structure may include a fixture formed by bending a wire in place of the plate member of the fixture 100 of the first embodiment (not shown).

Fourth Embodiment

Figure 9A:
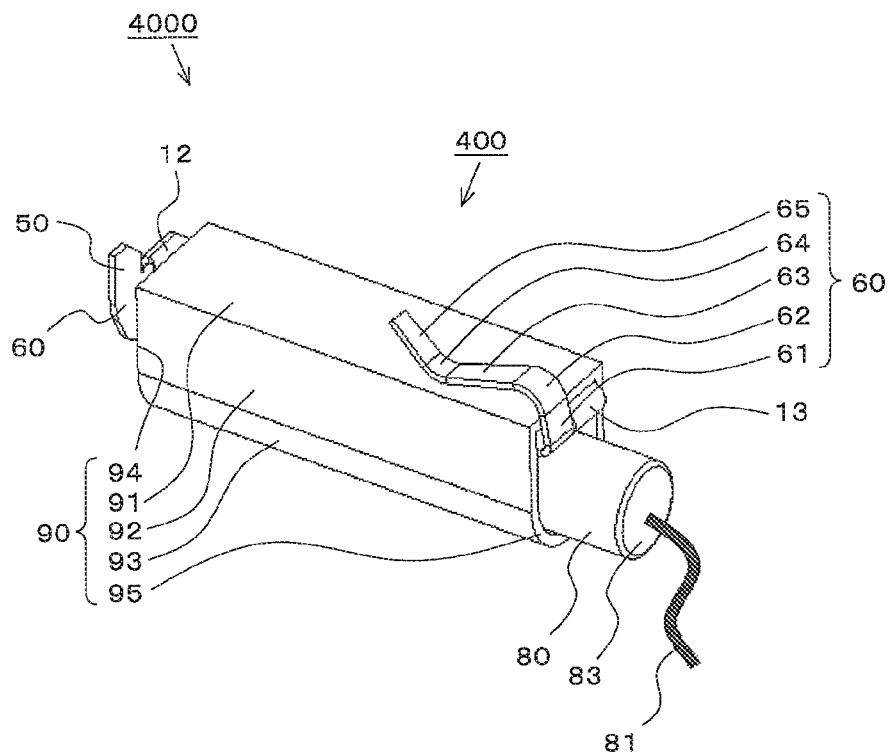
FIGS. 9A and 9B are entire perspective views each illustrating a thermistor fixing structure according to a fourth embodiment of the present invention.
Figure 9B:
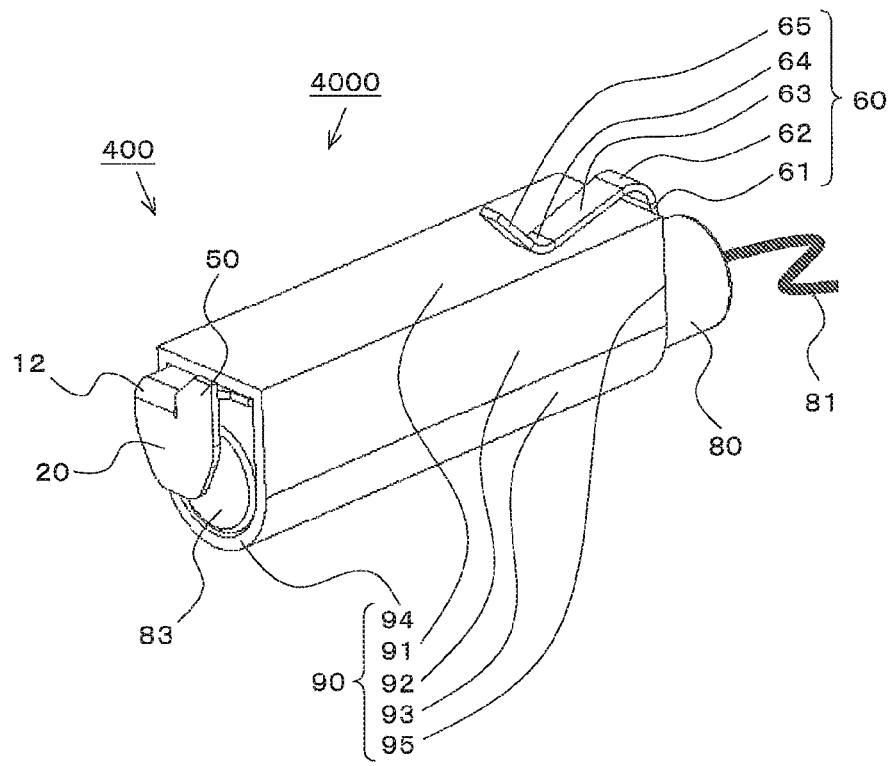
Figure 10A:
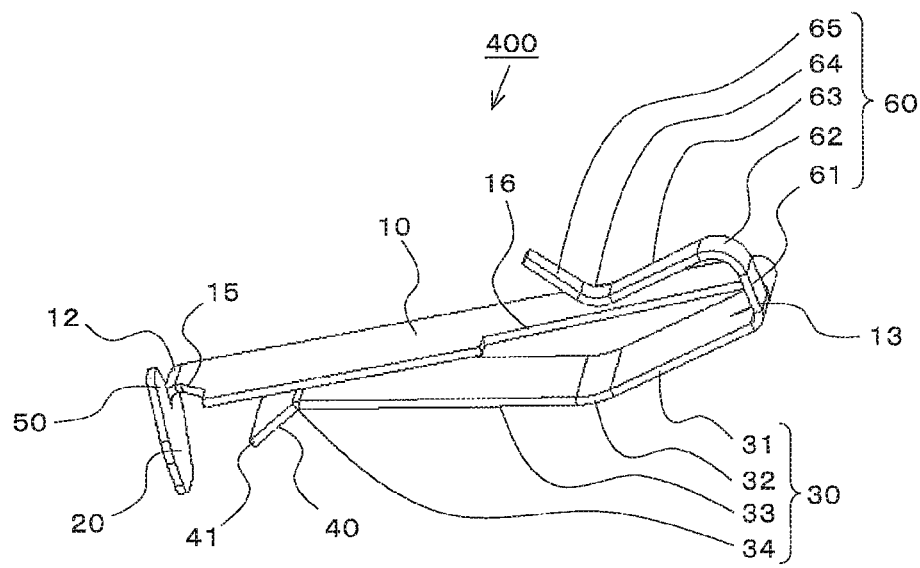
FIGS. 10A and 10B are perspective views each illustrating a part (fixture) of the thermistor fixing structure illustrated in FIGS. 9A and 9B.
Figure 10B:
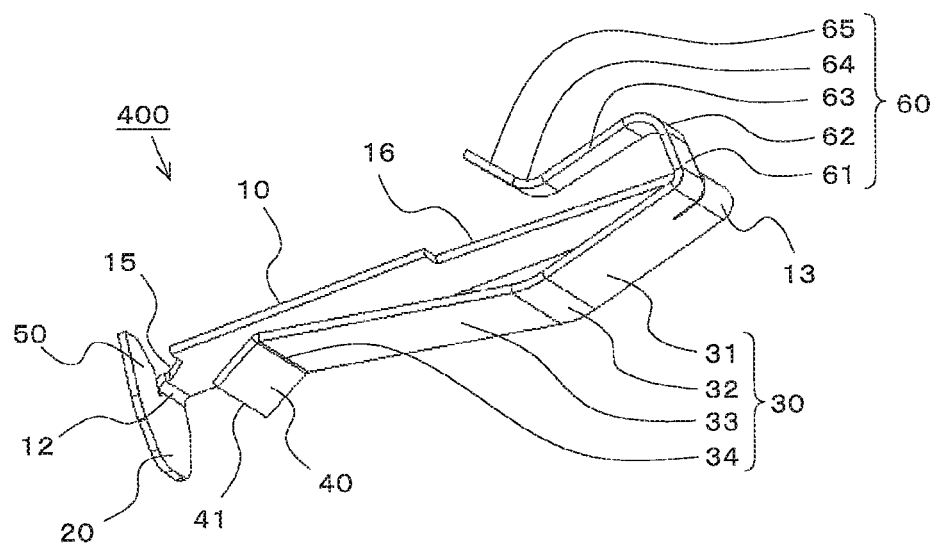
Figure 11:
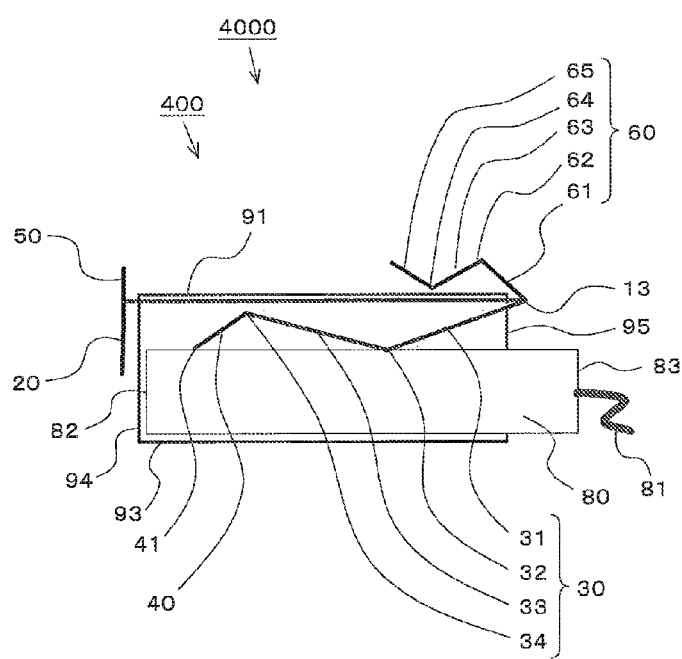
FIG. 11 is an entire side sectional view illustrating the thermistor fixing structure illustrated in FIGS. 9A and 9B.

FIGS. 9A to 11 illustrate a thermistor fixing structure according to a fourth embodiment of the present invention. FIGS. 9A and 9B are entire perspective views each illustrating the thermistor fixing structure. FIGS. 10A and 10B are perspective views each illustrating a part (fixture) of the thermistor fixing structure. FIG. 11 is an entire side sectional view illustrating the thermistor fixing structure. Note that, the same or corresponding parts as or to those of the second embodiment are represented by the same reference symbols, and the description is partially omitted herein. Further, the respective figures are schematic views, and the present invention is not limited to the illustrations of the respective figures.

In FIGS. 9A to 11, a thermistor fixing structure 4000 includes the temperature sensitive cylinder 90, the thermistor 80, and a fixture 400 including the pressing section 40 and the projecting portion 32 for pressing the thermistor 80 against the inner surface of the temperature sensitive cylinder 90.

The fixture 400 is formed by modifying the fixture 200 of the second embodiment. A slit 15 is processed at the one end portion 12 of the longitudinal section 10 in the longitudinal direction, and a part cut out from the longitudinal section 10 by the slit 15 is connected to the bending section 20, to thereby serve as an outer bending section 50 flush with the bending section 20. For convenience of the description, the bending section 20 is referred to as "inner bending section 20."

Further, a slit 16 is processed at the other end portion 13 of the longitudinal section 10 in the longitudinal direction, and a part cut out from the longitudinal section 10 by the slit 16 is connected to the folding section 30 and folded toward the outer bending section 50, to thereby serve as an outer folding section 60. For convenience of the description, the folding section 30 is referred to as "inner folding section 30."

The outer folding section 60 includes an outer perpendicular portion 61 connected to the other end portion 13 of the longitudinal section 10 in the longitudinal direction, an outer circular-arc portion 62 connected to the outer perpendicular portion 61, an outer insertion-side inclined portion 63 connected to the outer circular-arc portion 62 and inclined closer to the longitudinal section 10 as being closer to the outer bending section 50, a circular-arc outer projecting portion 64 connected to the outer insertion-side inclined portion 63, and an outer stop-side inclined portion 65 connected to the outer projecting portion 64 and inclined away from the longitudinal section 10 as being closer to the outer bending section 50.

With this configuration, when the longitudinal section 10 and the inner folding section 30 are inserted into the temperature sensitive cylinder 90 from the cylinder insertion end 95 so that the outer folding section 60 is located on an outer side of the cylinder top surface 91 of the temperature sensitive cylinder 90, the cylinder top surface 91 of the temperature sensitive cylinder 90 is brought into a state of being sandwiched between the longitudinal section 10 and the outer folding section 60 (to be accurate, one of the longitudinal section 10 and the outer folding section 60 may not be brought into abutment against the cylinder top surface 91). Then, the outer bending section 50 is opposed to or brought into abutment against the cylinder stop end 94 at a position projecting from the temperature sensitive cylinder 90 (see FIG. 11). Thus, even under the state in which the thermistor 80 is not inserted, the fixture 400 does not easily drop off the temperature sensitive cylinder 90. Note that, an apex of the outer projecting portion 64 may be brought into abutment against the longitudinal section 10 in advance.

Similarly to the thermistor fixing structure 2000 (second embodiment), both the apex of the projecting portion 32 of the inner folding section 30 and the distal end 41 of the pressing section 40 are brought into abutment against the side surface of the thermistor 80 inserted into the temperature sensitive cylinder 90, and hence the thermistor 80 is pressed against the cylinder bottom surface 93 of the temperature sensitive cylinder 90 with the pressing forces applied at those two points. Thus, the thermistor 80 is pressed stably so that the thermistor 80 is brought into contact with the cylinder bottom surface 93 of the temperature sensitive cylinder 90 more securely. As a result, the accuracy of temperature detection is enhanced.

In the above description, the thermistor 80 is pressed at two points, but the present invention is not limited thereto. In accordance with the thermistor fixing structure 1000 (first embodiment), the projection amount of the projecting portion 32 of the inner folding section 30 may be reduced or the inner folding section 30 may be formed into a flat shape so that the thermistor 80 is pressed at one point.

Fifth Embodiment

Figure 12A:
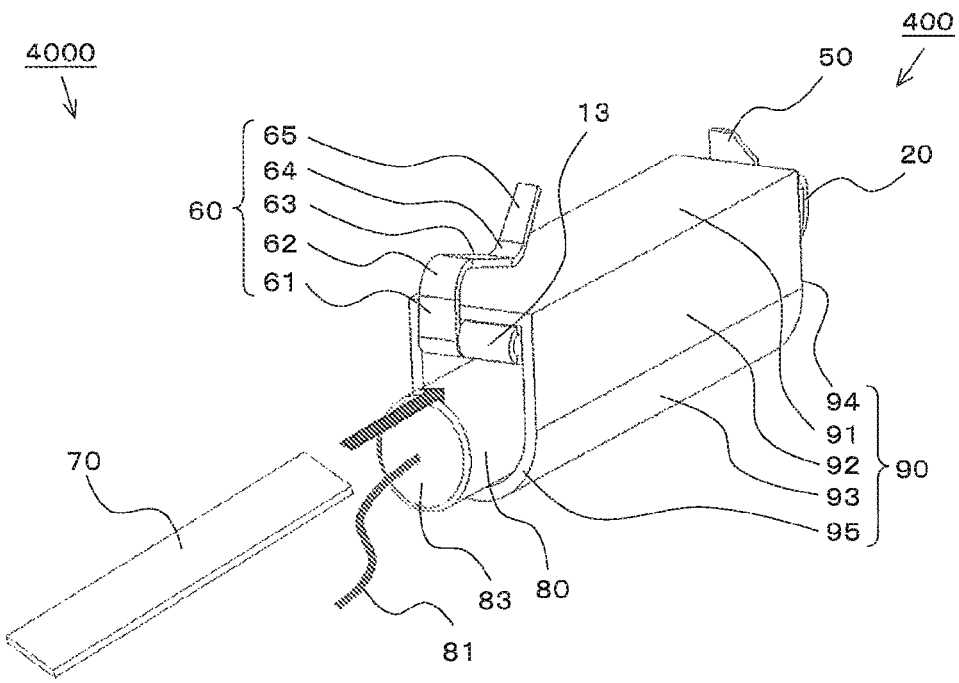
FIGS. 12A and 12B are an entire perspective view and a side sectional view each illustrating a thermistor removing method according to a fifth embodiment of the present invention.
Figure 12B:
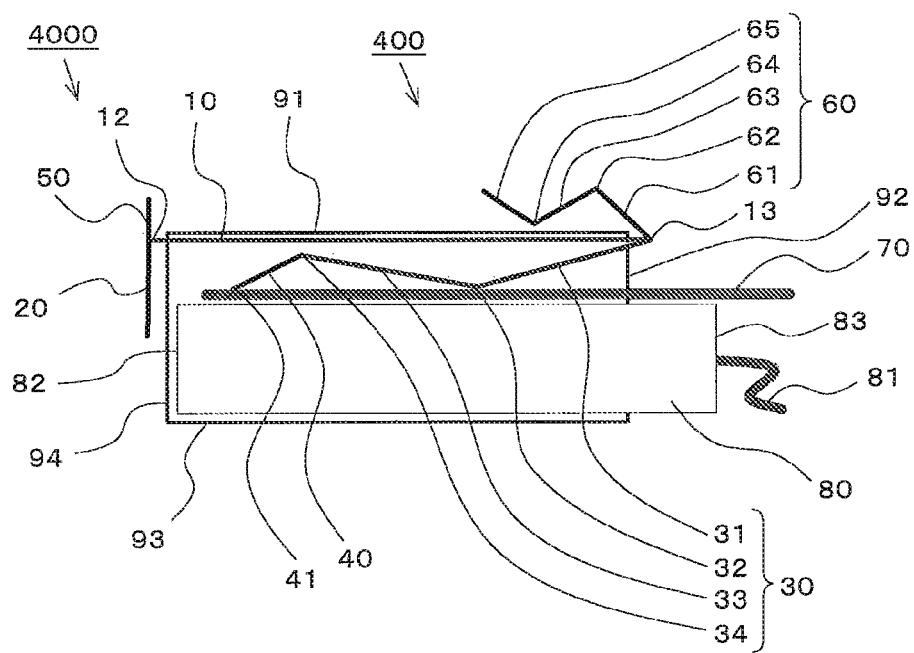

FIGS. 12A and 12B are an entire perspective view and a side sectional view each illustrating a thermistor removing method according to a fifth embodiment of the present invention. Note that, the same parts as those of the fourth embodiment are represented by the same reference symbols, and the description is partially omitted herein. Further, the respective figures are schematic views, and the present invention is not limited to the illustrations of the respective figures.

The thermistor removing method is a method of removing the thermistor 80 fixed to the thermistor fixing structure 4000 (fourth embodiment) from the temperature sensitive cylinder 90. In this method, there is used a strip-like separation plate member 70 formed of, for example, a stainless material or a steel plate that is at least less prone to have impressions (higher in hardness) than the side surface of the thermistor 80.

In FIG. 12A, the separation plate member 70 is inserted into the temperature sensitive cylinder 90 from the cylinder insertion end 95. In this case, the separation plate member 70 is inserted along the side surface of the thermistor 80 to a wedge-like portion formed by the side surface of the thermistor 80 and the insertion-side inclined portion 31 of the inner folding section 30 (see FIG. 12B).

In FIG. 12B, the separation plate member 70 is further inserted so that the separation plate member 70 is thrust into an abutting portion between the distal end 41 of the pressing section 40 connected to the inner folding section 30 and the side surface of the thermistor 80.

Therefore, the distal end 41 of the pressing section 40 is separated from the side surface of the thermistor 80, and hence, when the thermistor 80 is pulled toward the cylinder insertion end 95 in this state, the distal end 41 of the pressing section 40 does not dig into the separation plate member 70, thereby being capable of facilitating the removal of the thermistor 80 from the temperature sensitive cylinder 90.

That is, as described above, the thermistor fixing structure 4000 is originally configured such that the removal of the thermistor 80 from the temperature sensitive cylinder 90 is disabled or restricted under a state in which the fixture 400 is mounted to the temperature sensitive cylinder 90, and that the removal of the fixture 400 from the temperature sensitive cylinder 90 is disabled under a state in which the fixture 400 and the thermistor 80 are integrated with each other. Thus, the thermistor removing method using the separation plate member 70 provides such a remarkable effect that the thermistor 80 can easily be removed from the temperature sensitive cylinder 90.

Sixth Embodiment

Figure 13A:
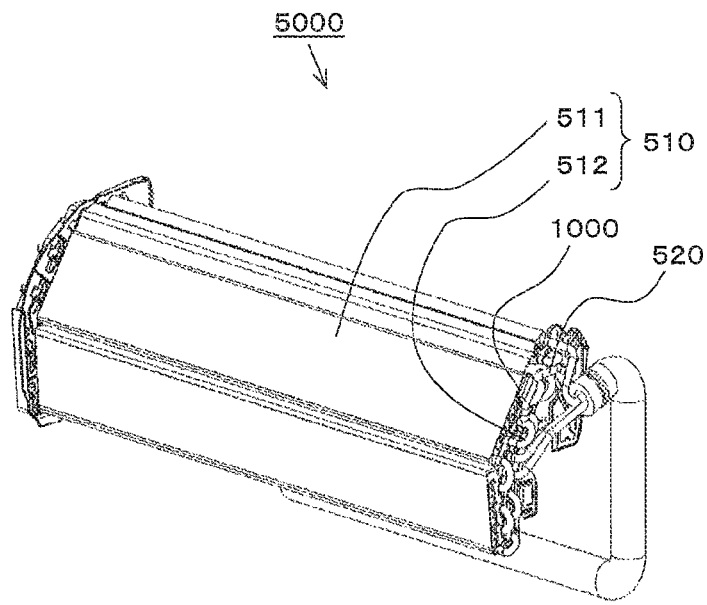
FIGS. 13A and 13B are a perspective view and an enlarged side view each illustrating a part (heat exchanger) of an air-conditioning apparatus according to a sixth embodiment of the present invention.
Figure 13B:
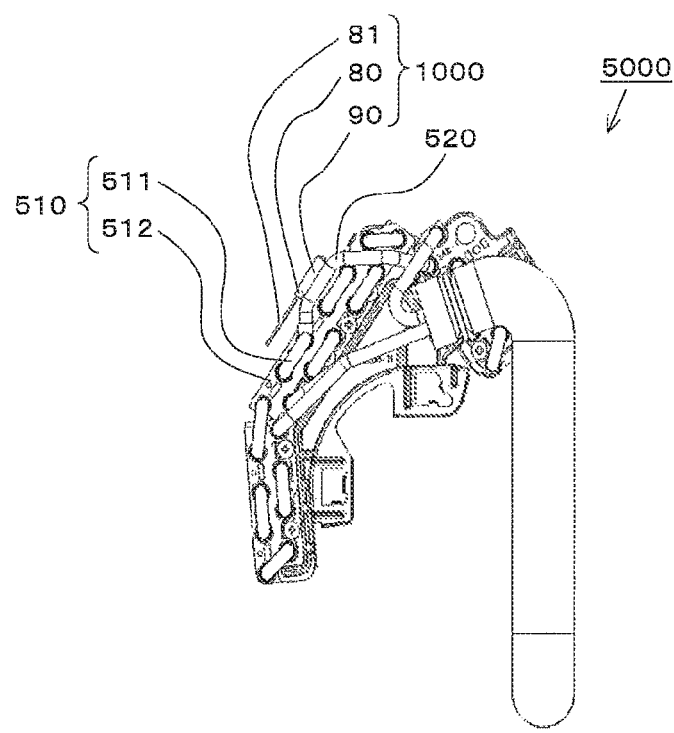

FIGS. 13A and 13B are a perspective view and an enlarged side view each illustrating a part (heat exchanger) of an air-conditioning apparatus according to a sixth embodiment of the present invention. Note that, the same parts as those of the first embodiment are represented by the same reference symbols, and the description is partially omitted herein. Further, the respective figures are schematic views, and the present invention is not limited to the illustrations of the respective figures.

In FIG. 13A, an air-conditioning apparatus 5000 is configured to execute a refrigeration cycle. The air-conditioning apparatus 5000 at least includes a heat exchanger 510 for exchanging heat between a refrigerant and air.

The heat exchanger 510 includes a plurality of radiator plates 511, and a heat transfer pipe 512 fixed to the radiator plates 511 to pass through the radiator plates 511 in a zigzag pattern. A refrigerant pipe 520 is connected to the heat transfer pipe 512.

Further, the thermistor fixing structure 1000 (first embodiment) is mounted to a part of the refrigerant pipe 520. That is, the temperature sensitive cylinder 90 is fixed to the refrigerant pipe 520 by brazing, and the thermistor 80 inserted into the temperature sensitive cylinder 90 is pressed against the inner surface of the temperature sensitive cylinder 90 with the fixture 100 (not shown).

Thus, as described above, according to the thermistor fixing structure 1000, accurate temperature measurement can be carried out, and the removal of the thermistor 80 from the temperature sensitive cylinder 90 is disabled or restricted while the insertion of the thermistor 80 into the temperature sensitive cylinder 90 is facilitated. Moreover, even under the state in which the thermistor 80 is not inserted, the fixture 100 does not easily drop off the temperature sensitive cylinder 90. As a result, the accuracy of refrigerant temperature measurement is enhanced in the air-conditioning apparatus 5000, and fixing work for the thermistor 80 and work for a periphery of the fixed thermistor 80 are facilitated in a manufacturing process for the air-conditioning apparatus 5000.

Note that, the procedure of mounting the thermistor fixing structure 1000 to the temperature sensitive cylinder 90 is not limited to the brazing. For example, the thermistor fixing structure 1000 may be bound to the temperature sensitive cylinder 90 with a band or pressed against the temperature sensitive cylinder 90 with a clip.

Further, in the above description, the thermistor fixing structure 1000 is mounted to a part of the refrigerant pipe 520, but the present invention is not limited thereto. The thermistor fixing structure 1000 may be mounted to other devices of the air-conditioning apparatus 5000 (for example, a refrigerant compressor), and any one of the thermistor fixing structures 2000 to 4000 (second to fourth embodiments) may be mounted in place of the thermistor fixing structure 1000.

What is claimed is:
1. A thermistor fixing structure, comprising:
    a temperature sensitive cylinder having openings at both ends thereof;
    a thermistor inserted into the temperature sensitive cylinder; and
    a fixture comprising a pressing section for pressing the thermistor against an inner surface of the temperature sensitive cylinder,
    a distal end of the pressing section being brought into abutment against a side surface of the thermistor inserted into the temperature sensitive cylinder,
    an angle formed between the pressing section and the side surface of the thermistor on a cylinder insertion end side of the temperature sensitive cylinder being an acute angle,
    the fixture further comprising:
        a longitudinal section;
        a bending section formed continuously with one side of the longitudinal section in a longitudinal direction thereof; and
        a folding section formed continuously with another side of the longitudinal section in the longitudinal direction so as to extend toward the bending section,
    the pressing section being formed continuously with a distal end of the folding section so as to be inclined gradually away from the longitudinal section.
2. A thermistor fixing structure of claim 1,
    wherein the fixture is formed of one of a plate member and a wire, and
    wherein, when the thermistor is inserted into the temperature sensitive cylinder under a state in which the longitudinal section is arranged along an outer surface of the temperature sensitive cylinder, the bending section is set at one of a position where the bending section abuts against a cylinder stop end of the temperature sensitive cylinder and a position where the bending section confronts the cylinder stop end, and the folding section is inserted into the temperature sensitive cylinder from the cylinder insertion end side, the distal end of the pressing section is brought into abutment against the side surface of the thermistor so that the thermistor is pressed against the inner surface of the temperature sensitive cylinder.
3. A thermistor fixing structure of claim 2,
    wherein the folding section comprises a projecting portion formed so as to project away from the longitudinal section, and wherein, when the distal end of the pressing section is brought into abutment against the side surface of the thermistor, an apex of the projecting portion is also brought into abutment against the side surface of the thermistor.

4. A thermistor fixing structure of claim 3, wherein, when the distal end of the pressing section is brought into abutment against the side surface of the thermistor, the distal end of the folding section is brought into abutment against the inner surface of the temperature sensitive cylinder.

5. A thermistor fixing structure of claim 3, wherein an end surface of the thermistor is brought into abutment against the bending section.

6. An air-conditioning apparatus, comprising at least:
a refrigerant pipe for executing a refrigeration cycle; and
the thermistor fixing structure of claim 3, which is mounted to the refrigerant pipe.

7. A thermistor fixing structure of claim 2, wherein, when the distal end of the pressing section is brought into abutment against the side surface of the thermistor, the distal end of the folding section is brought into abutment against the inner surface of the temperature sensitive cylinder.

8. A thermistor fixing structure of claim 7, wherein an end surface of the thermistor is brought into abutment against the bending section.

9. A thermistor fixing structure of claim 2, wherein an end surface of the thermistor is brought into abutment against the bending section.

10. An air-conditioning apparatus, comprising at least:
a refrigerant pipe for executing a refrigeration cycle; and
the thermistor fixing structure of claim 2, which is mounted to the refrigerant pipe.

11. A thermistor fixing structure of claim 1, wherein
the bending section includes an inner bending section and an outer bending section,
the folding section includes:
an inner folding section formed on another side of the longitudinal section in the longitudinal direction so as to extend toward the inner bending section; and
an outer folding section formed on the another side of the longitudinal section in the longitudinal direction so as to extend toward the outer bending section,
wherein the pressing section is formed continuously with a distal end of the inner folding section so as to be inclined gradually away from the longitudinal section, and
wherein, when the thermistor is inserted into the temperature sensitive cylinder under a state in which the longitudinal section is arranged along the inner surface of the temperature sensitive cylinder, the outer bending section is set at one of a position where the outer bending section abuts against a cylinder stop end of the temperature sensitive cylinder and a position where the outer bending section confronts a cylinder stop end, and the outer folding section is arranged on an outer surface of the temperature sensitive cylinder and is disposed on the cylinder insertion end side, the distal end of the pressing section is brought into abutment against the side surface of the thermistor so that the thermistor is pressed against the inner surface of the temperature sensitive cylinder.

12. A thermistor fixing structure of claim 11, wherein the inner folding section comprises a projecting portion formed so as to project away from the longitudinal section, and
wherein, when the distal end of the pressing section is brought into abutment against the side surface of the thermistor, an apex of the projecting portion is also brought into abutment against the side surface of the thermistor.

13. A thermistor fixing structure of claim 12, wherein, when the distal end of the pressing section is brought into abutment against the side surface of the thermistor, the distal end of the inner folding section is brought into abutment against the longitudinal section so as to press the longitudinal section against the inner surface of the temperature sensitive cylinder.

14. A thermistor fixing structure of claim 12, wherein an end surface of the thermistor is brought into abutment against the bending section.

15. A thermistor fixing structure of claim 11, wherein, when the distal end of the pressing section is brought into abutment against the side surface of the thermistor, the distal end of the inner folding section is brought into abutment against the longitudinal section so as to press the longitudinal section against the inner surface of the temperature sensitive cylinder.

16. A thermistor fixing structure of claim 15, wherein an end surface of the thermistor is brought into abutment against the bending section.

17. A thermistor fixing structure of claim 11, wherein an end surface of the thermistor is brought into abutment against the inner bending section.

18. An air-conditioning apparatus, comprising at least:
a refrigerant pipe for executing a refrigeration cycle; and
the thermistor fixing structure of claim 1, which is mounted to the refrigerant pipe.

19. A thermistor removing method for removing a thermistor fixed to a thermistor fixing structure from a temperature sensitive cylinder,
the thermistor fixing structure comprising:
a temperature sensitive cylinder having openings at both ends thereof;
a thermistor inserted into the temperature sensitive cylinder; and
a fixture comprising a pressing section for pressing the thermistor against an inner surface of the temperature sensitive cylinder,
a distal end of the pressing section being brought into abutment against a side surface of the thermistor inserted into the temperature sensitive cylinder,
an angle formed between the pressing section and the side surface of the thermistor on a cylinder insertion end side of the temperature sensitive cylinder being an acute angle,
the fixture further comprising:
a longitudinal section;
a bending section formed continuously with one side of the longitudinal section in a longitudinal direction thereof; and
a folding section formed continuously with another side of the longitudinal section in the longitudinal direction so as to extend toward the bending section,
the pressing section being formed continuously with a distal end of the folding section so as to be inclined gradually away from the longitudinal section,
the thermistor removing method comprising:
inserting a strip-like separation plate member into the temperature sensitive cylinder from the cylinder insertion end;
thrusting the separation plate member into an abutting portion between the distal end of the pressing section and the side surface of the thermistor;

removing the thermistor from the temperature sensitive cylinder; and removing the separation plate member from the temperature sensitive cylinder.

* * * * *